March 19, 1963     A. L. JOHNSON     3,082,007
DUSTING AND SEEDING ATTACHMENT FOR ROTARY POWER MOWERS
Filed May 16, 1960     2 Sheets-Sheet 1

INVENTOR.
ARTHUR L. JOHNSON
BY
Donnelly, Mentag & Harrington
ATTORNEYS

INVENTOR.
ARTHUR L. JOHNSON
BY
*Donnelly, Mentag & Harrington*
ATTORNEYS

United States Patent Office 3,082,007
Patented Mar. 19, 1963

3,082,007
DUSTING AND SEEDING ATTACHMENT FOR ROTARY POWER MOWERS
Arthur L. Johnson, P.O. Box 21, Tawas City, Mich.
Filed May 16, 1960, Ser. No. 29,288
2 Claims. (Cl. 275—2)

This invention relates generally to rotary lawn mowers and more particularly to a dusting and seeding attachment for use with rotary power mowers.

It is the primary object of this invention to provide a hopper attachment for easy and quick mounting on a rotary power mower and which may be used for dispensing DDT, chlorine dust, grass seed, fertilizer and the like.

It is another object of this invention to provide a hopper attachment of the class described which is simple and compact in construction, economical of manufacture and efficient in operation.

It is a further object of this invention to provide a hopper attachment of the class described which is adapted to be mounted on a rotary power mower so as to employ the exhaust air from the mower for dispersing the material discharged from the hopper, whereby it will be distributed evenly over the ground.

Other objects, features and advantages of this invention will be apparent from the following detailed description and appended claims, reference being had to the accompanying drawings forming a part of the specification, wherein like reference numerals designate corresponding parts of the several views.

Figure 1:
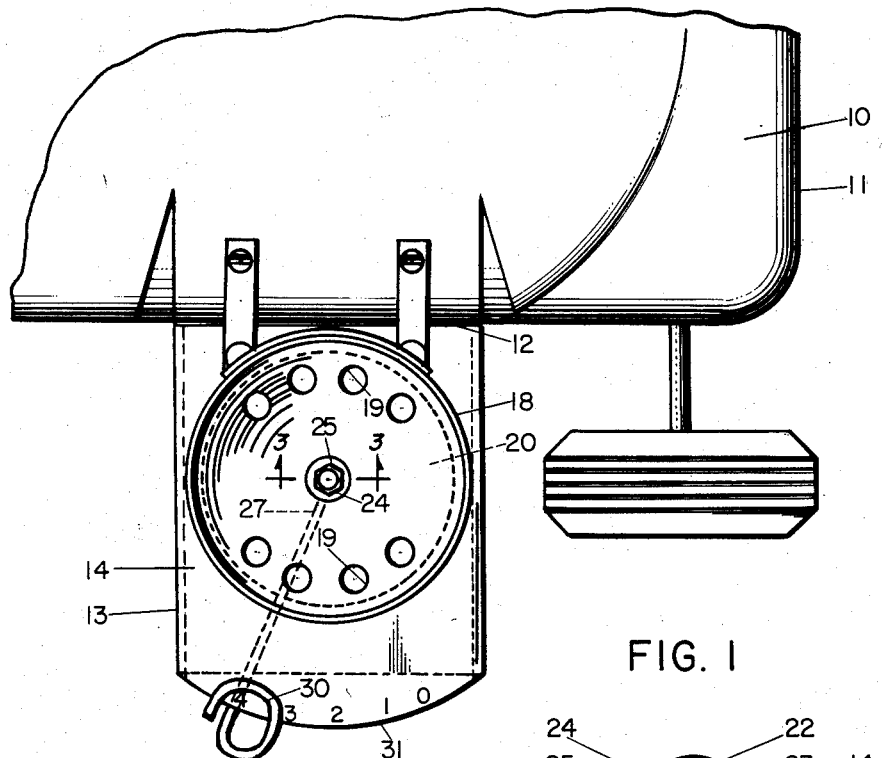
FIG. 1 is a top plan view of the hopper attachment of the invention and showing it attached to a rotary power mower which is only partially shown.

Referring now to the drawings wherein is shown an illustrative embodiment of the invention, the numeral 10 designates a conventional rotary lawn mower. Only the portion of a rotary lawn mower to which the hopper attachment is connected is illustrated in FIG. 1. The lawn mower 10 includes the housing 11 having the exhaust outlet or opening 12 formed on one side thereof for the expulsion of the cut grass and air pressure from the housing 11.

Figure 2:
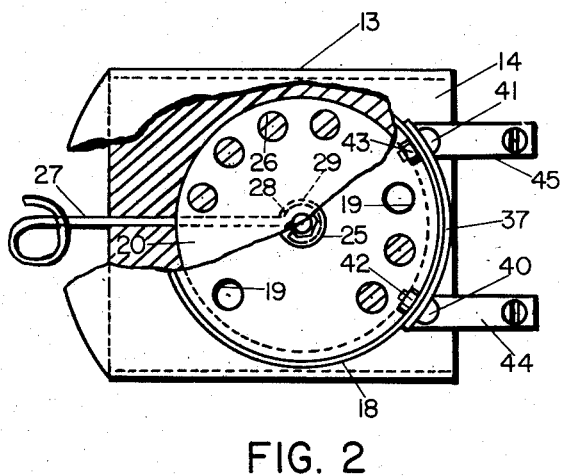
FIG. 2 is a top plan view of the hopper attachment, showing it removed from the mower and showing the hopper member moved to a position wherein the discharge openings are only partially open.
Figure 4:
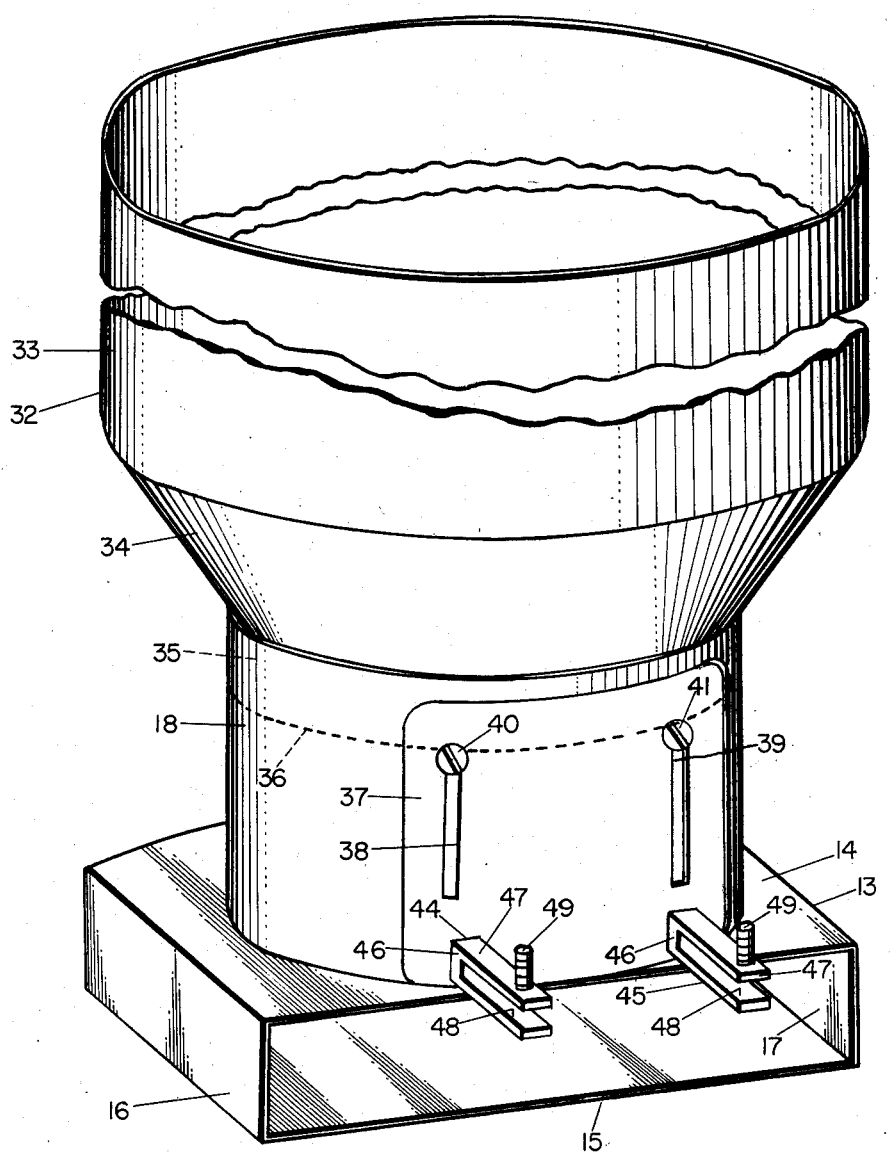

The hopper attachment of the present invention includes a rectangular hollow base member 13 which is open at oppositely disposed ends thereof to form an enclosed discharge passageway or flue. As shown in FIG. 1, the base member 13 is disposed on the mower housing 11 so as to have one of the open ends thereof in alignment with the exhaust opening 12 in the housing, whereby the exhaust air from the mower housing 11 will pass through the base member 13. The base member 13 may be made from any suitable material as, for example, from number 11 sheet metal or the like. As shown in FIGS. 1, 2 and 4, the base member 13 comprises the upper horizontal wall 14, the lower horizontal wall 15 and the vertical side walls 16 and 17. The base member side walls are fixedly secured together by any suitable means, as by welding.

As shown in FIGS. 1, 2 and 4, a cylindrical hopper member, generally indicated by the numeral 18, is fixedly mounted on the top wall 14 of the base member 13 by any suitable means, as by welding. The hopper member 18 surrounds and is concentrically disposed relative to a plurality of circular discharge openings 19 which are formed in the base top wall 14. The hopper member 18 is adapted to be filled with dusting material which is to be discharged through the holes 19 into the base member 13 for expulsion therefrom by the mower exhaust air.

Figure 3:
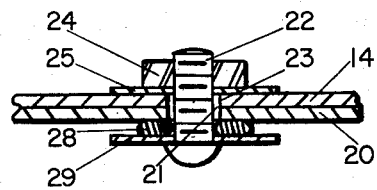
FIG. 3 is a fragmentary elevational sectional view of the structure illustrated in FIG. 1, taken along the line 3—3 thereof and looking in the direction of the arrows; and, FIG. 4 is an elevational perspective view of the hopper attachment of the invention and showing the attachment as provided with a hopper extension operatively mounted on the top thereof.

The openings 19 are adapted to be closed and regulated as to the amount of opening therethrough by means of a closure plate 20 adjustably mounted in the base member against the inner face of the top wall 14. As shown in FIGS. 2 and 3, the closure plate 20 is circular in cross section and is provided with a central hole 21 for the reception of the mounting bolt 22. The bolt 22 extends upwardly through the hole 23 in the base top wall 14 and is secured in place by means of the lock nut 24 and washer 25. The closure plate 20 is provided with a plurality of circular discharge openings 26 which are disposed so as to mate with the openings 19 and be aligned therewith when the plate 20 is rotated to the position shown in FIG. 1. FIG. 2 shows the closure plate 20 rotated slightly counter-clockwise to a position whereby some of the discharge openings 19 are partially closed to retard the flow of dusting material from the hopper member 18.

As shown in FIGS. 1, 2 and 3, the closure plate 20 is provided with the adjustable arm 27 for adjusting the plate relative to the base member for adjusting the position of the discharge openings 26 relative to the openings 19. The adjusting arm 27 has the inner end 28 bent around the screw 22. The arm 27 may be fixedly secured to the plate 20 by any suitable means as by welding. A washer 29 is disposed between the head of the bolt 22 and the rod portion 28.

The outer end of the adjusting arm 27 is coiled as indicated by the numeral 30. As shown in FIGS. 1 and 2, a portion of the coiled part 30 may overlap the curved outer edge 31 of the upper wall 14 so as to provide a friction grip therebetween. The upper surface of the curved wall portion may be marked with numerals as shown in FIGS. 1 and 2 to indicate the number of discharge openings which are operative when the operating arm or rod 27 is disposed opposite these numbers. It will be seen that when the arm 27 is moved to the left position as shown in FIG. 1, all of the discharge holes 19 will be open and when the arm 27 is moved to the extreme right position, all of the discharge holes 19 will be closed.

FIG. 4 shows the hopper member 18 being provided with a hopper extension member generally indicated by the numeral 32. The hopper extension 32 is provided with an upper enlarged cylindrical portion 33 which is open on the upper end thereof and which is connected by the convergent portion 34 to a lower tubular portion 35 which is adapted to be seated in the upper end of the hopper member 18. The numeral 36 indicates the lower edge of the hopper extension portion 35. It will be seen that the capacity of the hopper 18 may be increased by the use of an extension member as 32.

FIGS. 1, 2 and 4 show the means for detachably mounting the base member and hopper on the mower housing adjacent the air exhaust opening 12 for passage of the mower exhaust air through the base member 13. The mounting means includes the vertical elongated arcuately shaped sheet metal plate 37 which is provided with the vertical elongated holes 38 and 39 for the reception of the mounting screws 40 and 41, respectively. The screws 40 and 41 are fixedly mounted to the side wall of the hopper member 18 by means of the nuts 42 and 43, respectively. The screws 40 and 41 releasably secure the mounting plate 37 in any desired adjusted position relative to the hopper member 18. Fixedly secured to the lower end of the mounting plate 37, as by welding, are the two C-shaped mounting clamps 44 and 45. As shown in FIG. 4, each of the mounting clamps comprises the bight portions 46 which are welded to the plate 37. The mounting clamps 44 and 45 further include the vertically spaced apart upper and lower horizontal outwardly extended arms 47 and 48 which are adapted to be secured to the mower housing 11 by means of a clamping screw as 49.

In the use of the dusting attachment of the present invention the device would be secured to the housing 11 of a rotary mower in the position as shown in FIG. 1 whereby air being exhausted from the housing 11 would pass through the passageway formed by the base member 13. The closure plate 20 would be rotated to provide the desired discharge relationship between the openings 19 and 26. It will be seen that when the dusting material falls downwardly into the hollow base member 13, it will be expelled outwardly over the lawn in an efficient and evenly distributed manner.

While is will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. A hopper attachment for use with a rotary lawn mower having a housing with an air exhaust opening comprising, a base member having a discharge passageway therethrough; means for detachably mounting said base member on the mower housing adjacent the air exhaust opening for passage of the mower exhaust air through said base member; said base member being provided with a plurality of openings through the upper side thereof; a hopper member fixedly mounted on the upper side of the base member and surrounding said openings in said base member; a closure plate adjustably mounted in said base member and having a plurality of discharge openings therethrough adapted to be aligned with said first openings for passage of material from the hopper member into said discharge passageway; and, means for adjusting said closure plate relative to said base member for adjusting the position of said discharge openings relative to said first mentioned openings.

2. A hopper attachment for use with a rotary lawn mower having a housing with an air exhaust opening comprising, a base member having a discharge passageway therethrough; means for detachably mounting said base member on the mower housing adjacent the air exhaust opening for passage of the mower exhaust air through said base member; said base member being provided with a plurality of openings through the upper side thereof; a hopper member fixedly mounted on the upper side of the base member and surrounding said openings in said base member; a closure plate adjustably mounted in said base member and having a plurality of discharge openings therethrough adapted to be aligned with said first openings for passage of material from the hopper member into said discharge passageway; means for adjusting said closure plate relative to said base member for adjusting the position of said discharge openings relative to said first memtioned openings; and, said hopper member being provided with an extension member on the upper end thereof.

References Cited in the file of this patent

UNITED STATES PATENTS

| | | |
|---|---|---|
| 1,619,316 | Root | Mar. 1, 1927 |
| 1,628,108 | Brown et al | May 10, 1927 |
| 1,883,409 | Roy | Oct. 18, 1932 |
| 2,538,756 | Braswell | Jan. 23, 1951 |
| 2,742,751 | Laughlin | Apr. 24, 1956 |
| 2,966,023 | Carpenter | Dec. 27, 1960 |
| 2,973,615 | Yaremchuk | Mar. 7, 1961 |
| 2,974,616 | Pawella | Mar. 14, 1961 |
| 3,023,562 | Slack | Mar. 6, 1962 |